United States Patent
Deshpande et al.

(10) Patent No.: US 10,643,160 B2
(45) Date of Patent: *May 5, 2020

(54) ORDER OPTIMIZATION IN HYBRID CLOUD NETWORKS

(71) Applicant: International Business Machines Corporation, Armonk, NY (US)

(72) Inventors: Ajay A. Deshpande, White Plains, NY (US); Saurabh Gupta, Irving, TX (US); Arun Hampapur, Norwalk, CT (US); Ali Koc, White Plains, NY (US); Yingjie Li, Chappaqua, NY (US); Xuan Liu, Yorktown Heights, NY (US); Christopher Milite, Oxford, CT (US); Brian L. Quanz, Yorktown Heights, NY (US); Chek Keong Tan, Danbury, CT (US); Dahai Xing, White Plains, NY (US); Xiaobo Zheng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 434 days.

This patent is subject to a terminal disclaimer.

(21) Appl. No.: 15/406,342

(22) Filed: Jan. 13, 2017

(65) Prior Publication Data

US 2017/0213174 A1 Jul. 27, 2017

Related U.S. Application Data

(60) Provisional application No. 62/337,102, filed on May 16, 2016, provisional application No. 62/279,738, filed on Jan. 16, 2016.

(51) Int. Cl.
*G06Q 10/06* (2012.01)

(52) U.S. Cl.
CPC ..... *G06Q 10/06315* (2013.01); *G06Q 10/067* (2013.01); *G06Q 10/0633* (2013.01)

(58) Field of Classification Search
CPC ................................. G06Q 10/06315
See application file for complete search history.

(56) References Cited

U.S. PATENT DOCUMENTS

| | | | |
|---|---|---|---|
| 7,051,071 B2* | 5/2006 | Stewart | G06Q 10/06 709/204 |
| 7,853,480 B2* | 12/2010 | Taylor | G06Q 10/08 705/22 |

(Continued)

FOREIGN PATENT DOCUMENTS

WO 2011/139630 A1 11/2011

OTHER PUBLICATIONS

Acimovic, "Lowering Outbound Shipping Costs in an Online Retail Environment by Making Better Fulfillment and Replenishment Decisions", Massachusetts Institute of Technology, Sep. 2012, 198 pages.

(Continued)

*Primary Examiner* — Andre D Boyce
(74) *Attorney, Agent, or Firm* — Scully, Scott, Murphy & Presser, P.C.; Joseph Petrokaitis, Esq.

(57) ABSTRACT

A system, method and computer program product for enhancing on-premise order management systems (OMS) designed for fulfillment transactions with analytic and optimization technologies and services hosted in a shared multi-tenant software-as-a-service (SaaS) environment, such as a hybrid cloud. The computer-implemented method improves an order management system by leveraging a "punch-out" approach based on user exits to integrate with and augment currently implemented order management processing and transaction flows. Using the hybrid cloud, an entity may retain data such as its accumulated business, sales, test and (Continued)

other data, and then run analytical queries, which can scale to support distributed computing tasks. A framework adaptor/connector is leveraged by the OMS to provide a web client for communicating with and integrating to the SaaS analytics runtime environment, encapsulating all necessary connection pooling, security, and data marshaling complexity away from the order management system to meet strict service response time windows.

10 Claims, 8 Drawing Sheets

(56) References Cited

U.S. PATENT DOCUMENTS

| | | | | |
|---|---|---|---|---|
| 8,407,110 | B1* | 3/2013 | Joseph | G06Q 10/087 705/26.1 |
| 9,986,004 | B1* | 5/2018 | Carruth | H04L 65/4084 |
| 2002/0095307 | A1* | 7/2002 | Greamo | G06Q 10/0631 705/7.12 |
| 2003/0058277 | A1* | 3/2003 | Bowman-Amuah | G06F 16/289 715/765 |
| 2003/0061068 | A1* | 3/2003 | Curtis | G06Q 10/06311 705/26.25 |
| 2005/0289087 | A1 | 12/2005 | Dixel et al. | |
| 2006/0010017 | A1* | 1/2006 | Hase | G06Q 10/06 703/7 |
| 2007/0208656 | A1* | 9/2007 | Feaver | G06Q 30/06 705/37 |
| 2010/0250746 | A1 | 9/2010 | Murase | |
| 2011/0219218 | A1* | 9/2011 | Addala | G06F 3/048 712/228 |
| 2012/0124584 | A1* | 5/2012 | Addala | G06F 9/542 718/102 |
| 2012/0204187 | A1 | 8/2012 | Breiter et al. | |
| 2012/0209788 | A1 | 8/2012 | Sundel | |
| 2013/0325741 | A1 | 12/2013 | Smalling et al. | |
| 2014/0012856 | A1* | 1/2014 | Abdelrahman | G06Q 30/0621 707/740 |
| 2014/0279294 | A1* | 9/2014 | Field-Darragh | G06Q 10/087 705/28 |
| 2015/0046363 | A1* | 2/2015 | McNamara | G06Q 10/0635 705/333 |
| 2015/0193226 | A1* | 7/2015 | Michelsen | G06F 8/70 717/120 |
| 2017/0039608 | A1* | 2/2017 | Sandre | H04L 63/102 |

OTHER PUBLICATIONS

NIST, "NIST Cloud Computing Program", http://csrc.nist.gov/groups/SNS/cloud-computing/index.html, Created on Nov. 15, 2010, Last updated on Mar. 2, 2016, 2 pages.

Xu, "Order Fulfillment in Online Retailing: What Goes Where", Massachusetts Institute of Technology, Sep. 2005, 146 pages.

List of IBM Patents or Patent Applications Treated As Related.

* cited by examiner

ORDER OPTIMIZATION IN HYBRID CLOUD NETWORKS

CROSS REFERENCE TO RELATED PATENTS AND APPLICATIONS

This application claims priority from U.S. Provisional Patent Application No. 62/279,738 filed Jan. 16, 2016 and U.S. Provisional Patent Application No. 62/337,102 filed on May 16, 2016, which is incorporated by reference as if fully set forth herein in its entirety.

FIELD

The present disclosure relates generally to the field of retail supply networks, and particularly, to computers, and computer applications, and computer-implemented methods for omni-channel fulfillment in retail supply networks that augment order management systems designed for fulfillment transactions with "Big Data" analytic and optimization technologies and hosted services.

BACKGROUND

Large Omni-channel retailers typically utilize on-premise Order Management Systems to manage the order fulfillment process across all their fulfillment channels such as E-fulfillment centers (EFC), distribution centers (DCs), ship-from-store (SFS) and third party logistics (3PL). As more and more retailers turn to predictive analytics and optimization models which leverage Big Data to improve their overall cost-to-serve, they often need to do this with SaaS hosted Big Data Analytics Platforms (due to the complexity of the infrastructure, technologies, data science skills required by such a platform).

BRIEF SUMMARY

A system architecture providing a fail-safe and scalable method for order optimization in networks such as hybrid cloud networks.

A hybrid cloud integration framework ensures optimization services hosted in the cloud can be called near real-time, in-line with the transactional processes of OMS systems running on-premise, and does so at scale, with both service fault tolerance and fail-safe mechanisms to ensure all orders are processed within defined transaction SLA window requirements.

According to one aspect, there is provided an order processing system. The order processing system comprises: one or more hardware processor devices configured to receive data relating to multiple customer orders for items and control a flow of order processing operations for each order implemented via an order management rules-based processing system; an optimizing system comprising one or more computing devices each configured to run an optimization model for optimizing an order processing operation; the one or more processor devices further running an on-premise client application configured to exit the order processing flow at any time during a respective order processing for that order, and communicate an optimization service request over a network to a computing device to optimize an order processing operation in accordance with one or more user objectives, the optimizing system configured to run an optimization model for each of multiple optimization service requests at a respective the computing device in parallel.

According to a further aspect, there is provided a method for processing customer orders for items. The method comprises: receiving, at one or more processor devices, data relating to multiple customer orders, the one or more processor devices controlling a flow of order processing operations for each order implemented via an order management rules-based processing system; running, at one or more computing devices, an optimization model for optimizing an order processing operation; running, via the one or more processor devices, an on-premise client application configured to exit the order processing flow at any time during a respective order processing for that order, and communicating an optimization service request over a network to a computing device to optimize an order processing operation in accordance with one or more user objectives, wherein the one or more computing devices are configured to run an optimization model for each of multiple optimization service requests in parallel.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The disclosure is directed to a computer system and computer-implemented method designed to enhance on-premise order management systems designed for fulfillment transactions with Big Data analytic and optimization technologies and services hosted in a shared multi-tenant SaaS environment, such as a hybrid cloud, thereby simplifying the adoption of advanced data sciences.

The computer system and computer-implemented method exemplifies an improvement to order management systems by leveraging a "punch-out" approach based on user exits to integrate with and augment currently implemented order management rule processing and transaction flows, establishing a foundation for fail-safe processing. Using the hybrid cloud, an entity may retain data such as its accumulated business, sales, test and other data, and then run analytical queries, which can scale to support demanding distributed computing tasks.

Figure 1:
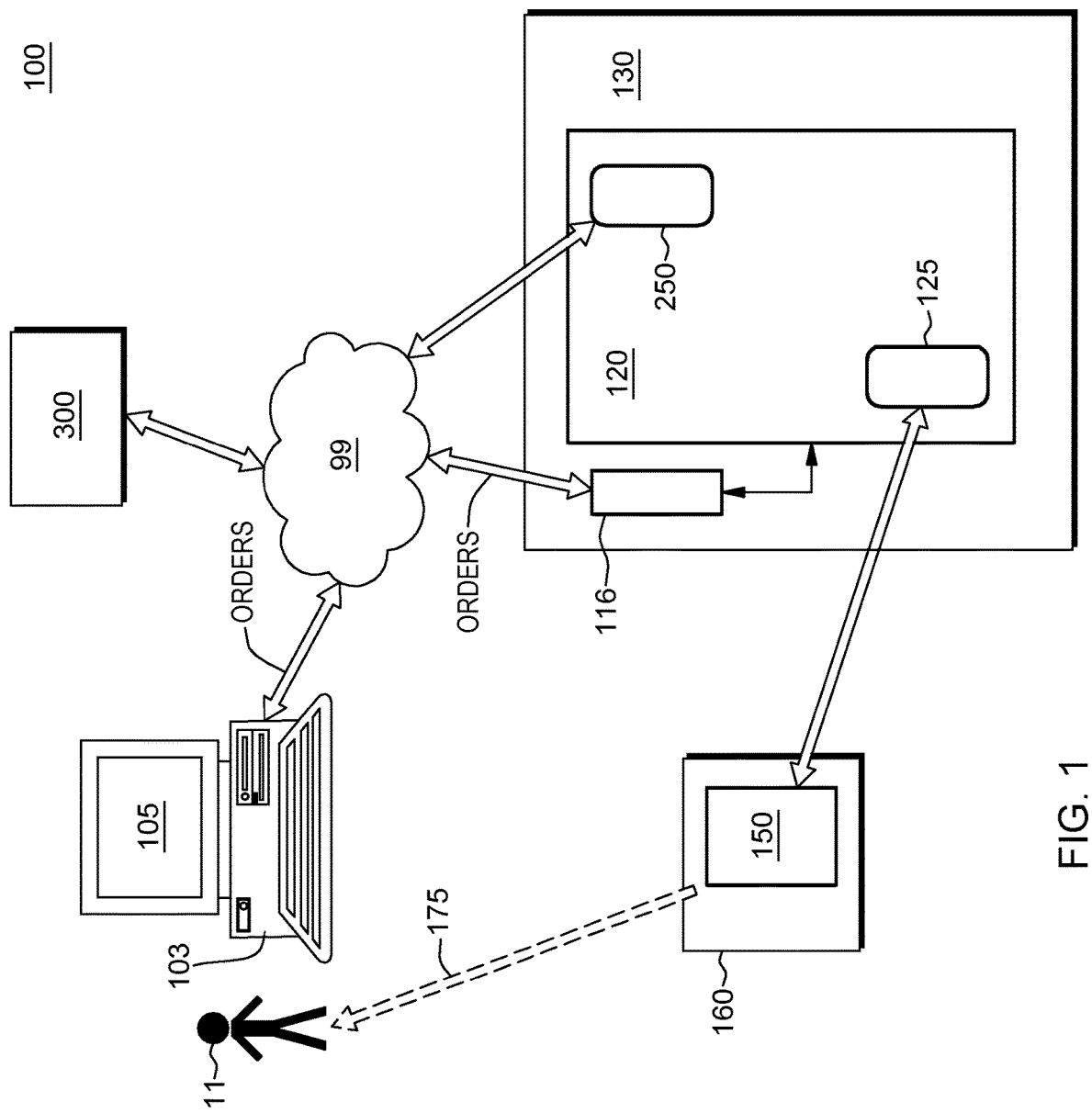
FIG. 1 conceptually depicts an example e-commerce retail supply network and order processing/fulfillment system that incorporates the methods described herein for real-time accessing analytic and optimization technologies and services hosted in a shared environment.

FIG. 1 conceptually depicts an example e-commerce retail supply network and order fulfillment system 100 that may be operated by or for an entity, e.g., a vendor of goods/products, and that incorporates the methods described herein for real-time accessing, during transaction order processing, analytic and optimization technologies and services hosted in a hybrid cloud environment. In one embodiment, the hybrid cloud environment is a shared multi-tenant "Software as a Service" (SaaS) environment 300, and enables communicating via real-time messaging over a communications network 99, e.g., the Internet. For purposes of description, a vendor may be an on-line, e-commerce retailer or like entity or seller of one or more products.

An on-premise, automated order management system 120 associated for order processing and fulfillment is provided to enable a customer 11, through a customer device 103, e.g., a mobile device such as a Smartphone or computer device, e.g., desktop, laptop, notebook, etc., to order goods/products on-line via a customer e-commerce interface 105 which is typically a web browser capable of accessing vendor system 130 via a world wide web communications link over the network 99. In one embodiment, a vendor system 130 is a web-based e-commerce system configured to accept electronic orders (e.g., e-commerce orders) from a customer 11 using the interface "storefront" 116 which may be designed in any one of a number of known ways to provide functionality for customers to use customer e-commerce interface 105 to electronically place orders with one or more vendors using vendor system 130. Thus, a customer via device 103 is able to generate orders with the vendor by using e-commerce interface 105 that passes such orders to an interface "storefront" 116. Associated order management system 120 is used to process the orders. In the system shown in FIG. 1, a web-based system is used in which vendor system 130 makes web pages available using storefront 116 for display by the web browser of customer e-commerce interface 105. A single vendor may have more than one storefront and will permit more than one customer 11 to access each of the storefronts. In one embodiment, each storefront is associated with the order management system.

It is understood that the on-premise automated order management system (OMS) 120 run at vendor system 130, shown with storefront 116 in FIG. 1, may be configured to permit orders to be placed through non-web channels. For example, a customer 11 may place orders using telephone, fax, or e-mail or other retail order interfaces. Different order management systems may be used as order management system 120 and the interface capabilities of such systems may vary.

While storefront 116 and order management system 120 are depicted in FIG. 1 as grouped together and located within vendor system 130, it is understood that other implementations are possible in which storefront 116 is maintained by a third party and passes information to order management system 120 that is hosted at vendor system 130. Order management system 120 may be alternatively co-hosted remotely from vendor system 130.

The automated order management system 120 runs computer implemented methods for receiving and filling orders for products more efficiently. Such systems are implemented by order management software packages that permit a vendor to manage the supply of products to customers. Such systems typically model a supply arrangement having fulfillment centers (e.g., "nodes" 160). A fulfillment center or node 160 may be a store, a warehouse or any physical location where inventory for a vendor is located. In one embodiment, each fulfillment center has or implements an associated fulfillment system 150.

In the system embodiment depicted in FIG. 1, order management system 120 thus may further include a fulfillment center function or object 125 associated with fulfillment system 150. In order management system 120, fulfillment center object 125 represents a fulfillment center (e.g., node 160) that corresponds to fulfillment system 150.

In typical implementations, staff at the fulfillment center 160 corresponding to fulfillment system 150 may package an item or product in the order and, in one embodiment, send to a specified location as depicted by broken arrow 175 directed from fulfillment node 160 to a customer 11 in FIG. 1. A confirmation of the shipment of the items may then be provided to order management system 120 by fulfillment system 150.

In one implementation, order management system 120 has a defined rule-based protocol for processing orders and communicating with fulfillment systems. In one embodiment, such order management systems permit the vendor to determine the products available at its fulfillment centers or nodes and to arrange for required products to be supplied to its customers in response to received orders.

In accordance with embodiment herein, a method may operate integrally within the OMS, e.g., as part of the order fulfillment processing flow or as provided as optional services to the OMS in conjunction with OMS order fulfillment processing. The method enables a user to automatically "punch-out" (i.e., exit) from the OMS transaction processing flow and access, in real-time, "Big Data" analytic and optimization technologies and services hosted in the shared hybrid cloud 300. A punch-out application programming interface (API) implemented by the on-premises OMS provides the mechanism for punching-out from the OMS transaction processing protocol to request optimization services from the hybrid cloud network.

As further shown in FIG. 1, OMS system 120 is provided with a SaaS framework connector object 250 implemented for the OMS system as an on-premise client utilized by the punch-out user exit API for accessing the hybrid cloud SaaS parallel compute environment 300. In one embodiment, the "Big Data" analytic and optimization technologies are embodied as hybrid cloud environment 300. In one embodiment, as a cluster of computing devices that each employ an optimization solver, e.g., an IBM® ILOG® CPLEX Optimizer, or like tool for solving linear optimization problems.

The cluster of computing devices that employ an optimization solver further provide services that are accessed via real-time messaging over the network 99 to run linear math or mixed-integer math optimization techniques to solve business critical applications. Thus, for example, during OMS order processing flow, an optimization problem solving technique may be called to determine a best node or a combination of nodes, e.g., at the lowest cost, or with lowest labor cost, or with the lowest load, from which to fulfill a customer order. Besides providing queries to the SaaS hybrid cloud optimization services, a mechanism is provided for the OMS to default to the normal rule-based OMS transaction processing flow, e.g., if it is determined that back-end optimization processing takes too long such that a customer's service level agreement (SLA) may be violated.

Figure 2:
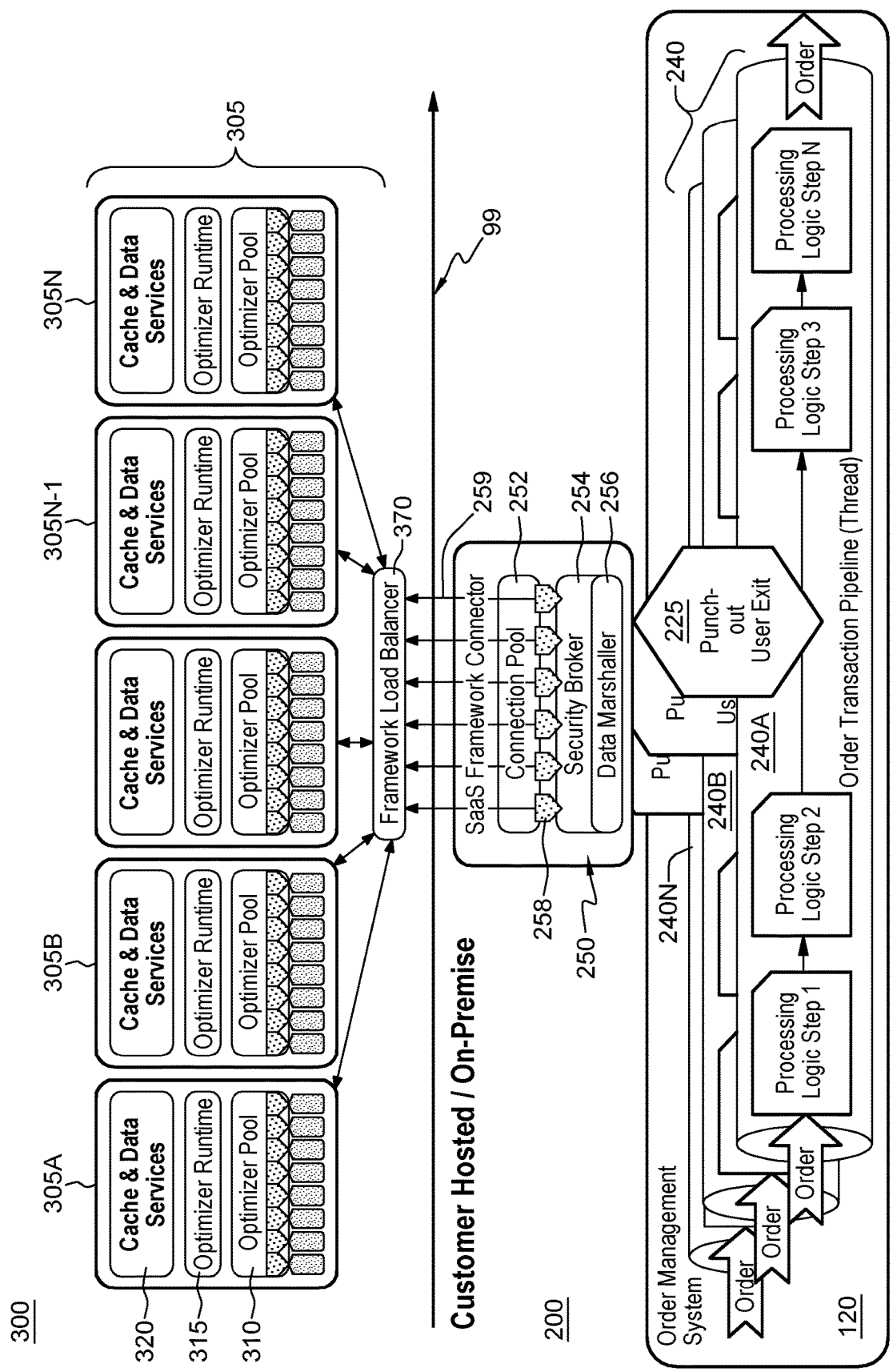
FIG. 2 shows a detailed system diagram including the on-premise system including an OMS system, and a hybrid cloud integration framework that ensures use of optimization services hosted in the cloud environment for performing order optimization according to one embodiment.

Turning now to FIG. 2, there is provided a more detailed system diagram including the on-premise computer system 200 running an OMS 120, e.g., at the vendor or like entity, that is in communication with the hybrid cloud integration framework 300 that ensures use of optimization services hosted in the cloud environment for performing order optimization. In one embodiment, the optimization services hosted in the cloud environment can be called near real-time, in-line with the transactional processes of an OMS system 120 running on-premise, and do so at scale, with both service fault tolerance and fail-safe mechanisms to ensure all orders are processed within defined transaction service level agreement (SLA) window requirements. Thus, for example, instead of implementing basic rule-based logic of the OMS processing system, an optimization model configured by a business user, may decide it is more important to the business, e.g., minimize shipping cost, avoid mark-down, balance fulfillment across network to avoid inventory risk or minimize labor cost, and thus call on such optimization service.

The system 200 of FIG. 2 provides a vendor hosted/on-premise order management system 120 running a variety of transaction and order fulfillment pipelines 240, represented as process threads 240A, 240B, . . . , 240N, each process thread representing a respective order transaction(s) submitted by respective customer(s), and received and processed by the OMS 120. Each respective order transaction(s) pipeline thread 240A, 240B, . . . , 240N, each runs a series of order processing and fulfillment steps of a typical OMS rule processing and transaction flow 240. For example, each received order may be processed in an associated order transaction pipeline in which a received customer order 205 for item(s) is processed by an order process pipeline running a series of processing logic steps such as steps 242, 244, 246, 248, etc., such as shown in pipeline thread 240A.

As shown in FIG. 2, the vendor hosted/on-premise OMS system 120 and computer-implemented method run on a processor device of the computing system is configured with "punch out" function call 225 enabling a user to exit the OMS 120 via a framework adaptor/connector 250 at any time during an OMS transaction processing flow. The framework adaptor/connector 250 provides a complete web client for communicating with and integrating with the hybrid cloud's Big Data analytics runtime environment 300. The user Exit "Punch-out" call 225 integrates with and augments currently implemented order management rule processing and transaction flows such as flows 240A, 240B, 240C shown in FIG. 2.

In one embodiment, the OMS system receives a plug-in framework connector software module 250 to configure the OMS 120 to perform a punch-out 225 at any defined point in the transaction flow of the pipeline, e.g., prior to order scheduling, or prior to determining an order fulfillment node. As shown in FIG. 2, there may be a configured in pipelined transaction flow 240A a punch-out exit after processing logic step 244. A user may access the plug-in on-premise client connector to configure the OMS processing to exit the flow at any predefined point of the order process in order to access the optimization logic provided in the hybrid cloud infrastructure 300.

The SaaS hosted run-time framework 300 runs further computer-implemented methods to enable/disable, on-demand, the punch-out exit call 225 to the optimization services.

In one embodiment, the framework connector 250 provides a scalable fault tolerant integration pattern with connection pooling so pipeline threads 240 can easily and quickly interact with SaaS framework 300. Moreover, as will be described in greater detail, current order processing pipeline logic or transactional threads 240 remain in-tact, providing a fail-safe baseline.

Framework connection 250 further encapsulates all necessary connection pooling, security, and data marshaling complexity away from the order management system 120. In one embodiment, this is implemented via a simple interface with well established return codes. That is, standard REST HTTP return codes are used for high-level response code. Upon a successful optimization, the HTTP payload will contain the results, otherwise, the payload will contain detail such as returned codes, short message, and exception stating reasons for optimization failure.

As further shown in FIG. 2, the SaaS hosted run-time framework 300 integrates Big Data based data resources and provides computer-implemented methods for parallel execution of optimization model processing, leveraging horizontally scalable multi-core hosting infrastructure, cross cluster data caching, model pooling, and service request load balancing.

In one embodiment, the SaaS framework connector on-premise client 250 implements a data marshaller element 256 to efficiently transform, e.g., serialize, the obtained data from the on-premise OMS pipeline processing flow(s) 240 into a format suitable for transmission from the OMS 120 to the cloud hosted SaaS optimizer service run-time framework 300. Via the punch out, data is passed to the framework connector web client and marshals (i.e., packages) the data on-premises for communication to an optimization server of the hybrid cloud service as fast as possible.

The SaaS framework connector on-premise client 250 further uses a security broker module 254 that establishes security token for all pre-established connections and monitors token lifecycle and refresh requirements, and ensure race conditions do not occur when token refresh is required. Thus, in one embodiment, security broker module 254 on-premises software is provided to act as a control point to support continuous visibility, compliance, threat protection, and security for optimization cloud services.

In one embodiment, all security marshalling is built inside the security broker module 254 of connector 250 and combines and interjects enterprise security policies as the cloud-based optimization framework resources are accessed, and consolidate multiple types of security policy enforcement, e.g., including authentication, single sign-on, authorization, credential mapping, device profiling, encryption, tokenization, logging in, alerting, malware detection/prevention, etc. In one embodiment, OAUTH (e.g., OAUTH 2.0 protocol) is a security protocol that may be used in one embodiment, to ensure the punch-out user can talk to the back end cloud service, i.e., implement the necessary security marshalling inside the connector based on the configuration of the user punch-out, e.g., built in functions in the connector to get user identification/password, know how to authenticate, and based on security tokens returned that have time-to-live, know when security tokens expire and implement a re-fresh.

In one embodiment, as shown in FIG. 2, the SaaS Framework Connector 250 on-premise client provides a scalable fault-tolerant parallel compute framework for performing optimization calls to the hybrid cloud optimization services. In one embodiment, SaaS framework connector further leverages a connection pooling mechanism 252 to minimize round-trip latency by having service connections pre-established; each OMS pipeline thread 240 performing a service request simply leverages a pre-established connection from the pool and returns it when the service call completes. Here, the connection pooling mechanism 252 ensures that the connector plug-in pre-creates connections to the hybrid cloud service, and stores the pre-created connections in a pool. Thus, every time a punch-out exit request comes in to optimize an order, it will borrow a connection from the pool to cut down the amount of latency between the calls.

In one embodiment, the framework connector 250 architecture thus allows for any number of OMS agent services to be spawned as a number of agent processing threads 258, by supporting the instantiation of a connector singleton per agent, and by supporting a configurable number of connections in each connector instance's pool. In one embodiment, an OMS agent, a multithreaded process, would instantiate a connector singleton. The connector singleton maintains a configurable number of connections. The number of configured connections should be no less than the number of threads in the OMS agent, i.e., there is a correlation of a number of Agent Threads to Connector connections.

Since the connector architecture supports the establishment of multiple instanced (multiple agents), an agent and its singleton can completely fail without disrupting all service requests.

The processing threads 258 indicate multiple calls and request responses that can be processed in parallel, i.e., multiple threads per the one connector plug-in 250, using borrowed connections from the pool. Thus, for example, given a number of pre-established connections in the connection pool, a like number of multiple threads 258 can be simultaneously run at the connector to call a respective optimization service for that number of orders.

In one embodiment, a configuration "properties" file is associated with the framework connector on-premise client 250, e.g., run as connection pool logic, specifying via ports/endpoints for communications to the hybrid cloud cluster, what are the set time-outs, how many line-items per/time out, when a user exits from OMS.

In a further embodiment, shown in FIG. 2, hybrid cloud services environment 300 provides a framework load balancer element 370 which embodies a single end-point connection via which a punch-out customer communicates with via the framework connector 250. Here, the load balancer element 370 is embodied as a load balancer that receives every request 259 that comes in via framework connector from OMS punch-out users. The load balancer element 370 implements a protocol to provide a balance for the hybrid cloud optimization processing, e.g., using a round-robin method, or any like method that spreads the work load at the hybrid cloud optimizer server cluster 305.

The Request Load Balancer 370 spreads the service request workload across the nodes in the cluster in a round-robin fashion; and each service request leverages a processor core at the server to process the optimization model. By auto-scaling the number of nodes in the cluster and increase the framework's available cores, the processing can scale "infinitely" and maintain constant response time performance.

The clustered architecture ensures service framework fault-tolerance; a node can completely fail with our effecting the overall cluster.

FIG. 2 further shows the hybrid cloud services server cluster 305 programmed to provide optimization services as requested by the punch-out user.

In one embodiment, the user punch-out call 225 is directed to framework connector configured to communicate via a web-based communication to call upon the hybrid cloud in-line transactional analytics services run at optimization server cluster 305 which are redundantly deployed across a cluster of servers 305A, 305B, ... 305N, etc. As the controller method at the OMS 120 needs to minimize round-trip latency, the service calls must be in a sub-second range, e.g., within the range of 10s to 100s of milliseconds, or any latency time-out constraint value, as configured by a user and provided as part of the logic implemented in the framework connector. The throughput (the number of transactions processed within some defined time constraint) needs to meet or exceed the SLAs already established by the traditional on-premise order management system 120.

In one embodiment, each optimizer server of cluster 305 is provided an optimizer pool module 310, an optimizer runtime module 315, and a cache and data services component 320. In one embodiment, the hybrid cloud framework 300 cache and data services block 320 running on a hybrid cloud computing device 305 are configured for memory access and data processing operations to ensure processing that minimizes the customer latency, via the optimization objectives specified by the user. In one aspect, each parallel compute framework optimization server 305 further leverages an optimizer pool mechanism 310 to eliminate the overhead of having to create a new optimization model upon each service request; each service request thread simply instantiates a pre-established optimization model from the pool and returns it when the service call completes. Thus, the SaaS environment 300 provides a horizontally scalable infrastructure providing up to an unlimited number of parallel processing cores 305A, . . . , 305N-1, 305N, each accessible to run in parallel for parallel execution of optimization models that are pre-established and pooled for instant execution.

In one embodiment, the cluster 305 of modules work in coordination with each other and are designed to ensure the overall optimization service can maximize fault tolerance and minimize service request response times. By pooling 310 (and reusing) the optimization model, latency is minimized by not having to spin-up or instantiate a new model upon each and every service request. By runtime module 315, each cluster node locally hosts the necessary optimization runtime libraries, thereby multiple optimization problems can be run simultaneously and elastically grow our runtime capacity by increasing cluster size (and also increase fault tolerance across the overall service. By Cache/Data Service 320, when a optimization request is executed on a given node in the cluster, to perform the actual solve, it will need access to up-to-date reference data (example, node carrier rates). This data is accessed via each node's data access services and is made highly performance by each node's "local" in-memory data cache.

Therefore upon receipt of a service request at 305, the request is sent to one of the nodes in the cluster. Once received by that node, the node uses/borrows a pre-instantiated model from the nodes Pool 310, and configures the model based on the service request. It then executes the configured model within the nodes Runtime engine 315, and when performing the model execution (solve) it accesses necessary reference data via the nodes reference data services/cache 320.

Figure 5:
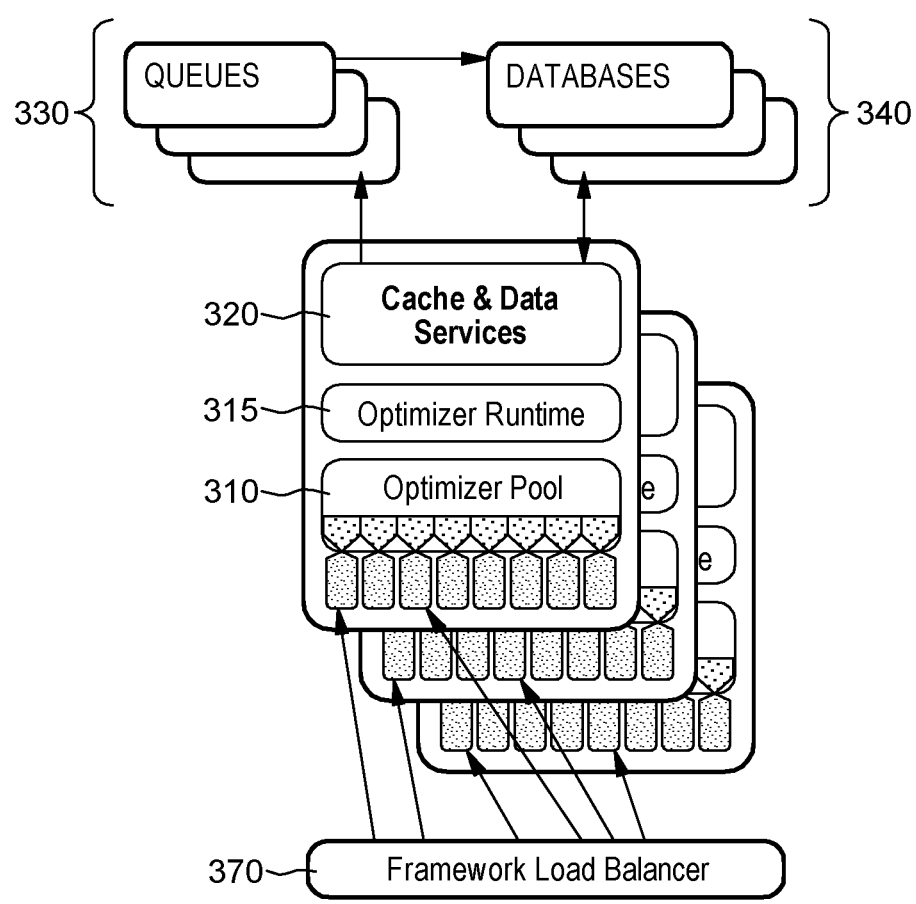
FIG. 5 depicts in more detail a computing node at the parallel compute optimization service framework architecture that leverages a cross-cluster in-memory data cache and provides optimization models and high-performance data access services in one embodiment.

As shown in FIG. 5, the parallel compute optimization service framework 300 further leverages a cross-cluster in-memory data cache 320 and provides optimization models high-performance data access services which drive key model computations; the memory cache utilizes a publication/subscription (Pub/sub) model, so that all nodes within the cluster are auto refreshed and kept synchronized when source data is updated.

In one embodiment, updates to reference data within the reference data persistent store are automated via ETL processes. As part of ETL processing, a message is sent to pub/sub queues which indicates that reference data has been updated. Each optimization node in the cluster is subscribed (listening) to the pub/sub queue. Once each node received the "update" message, it is responsible for updating its version of the cached reference data in question, after which each node in the cluster is synchronized with the each other and the underlying reference data persistence store.

The parallel compute optimization service framework 300 further utilizes redundancy across all framework components inclusive of the Load Balancer 370, message queues 330 and the databases 340 to ensure the framework itself has no single point of failure.

In one embodiment, the compute optimization service framework is run isolated from the rest of input/output data processing (persistence, KPI) frameworks. The touchpoints between the two frameworks are through message queues. Each node in the compute optimization service framework node maintains its caches. Each cache is kept up-to-date and in synch with the data in the persistent store via pub/sub subscriptions. This isolation architecture provides an additional level of fault-tolerance and improved optimization performance as direct interaction with the persistence layer does not have to be performed synchronously.

Figure 4A:
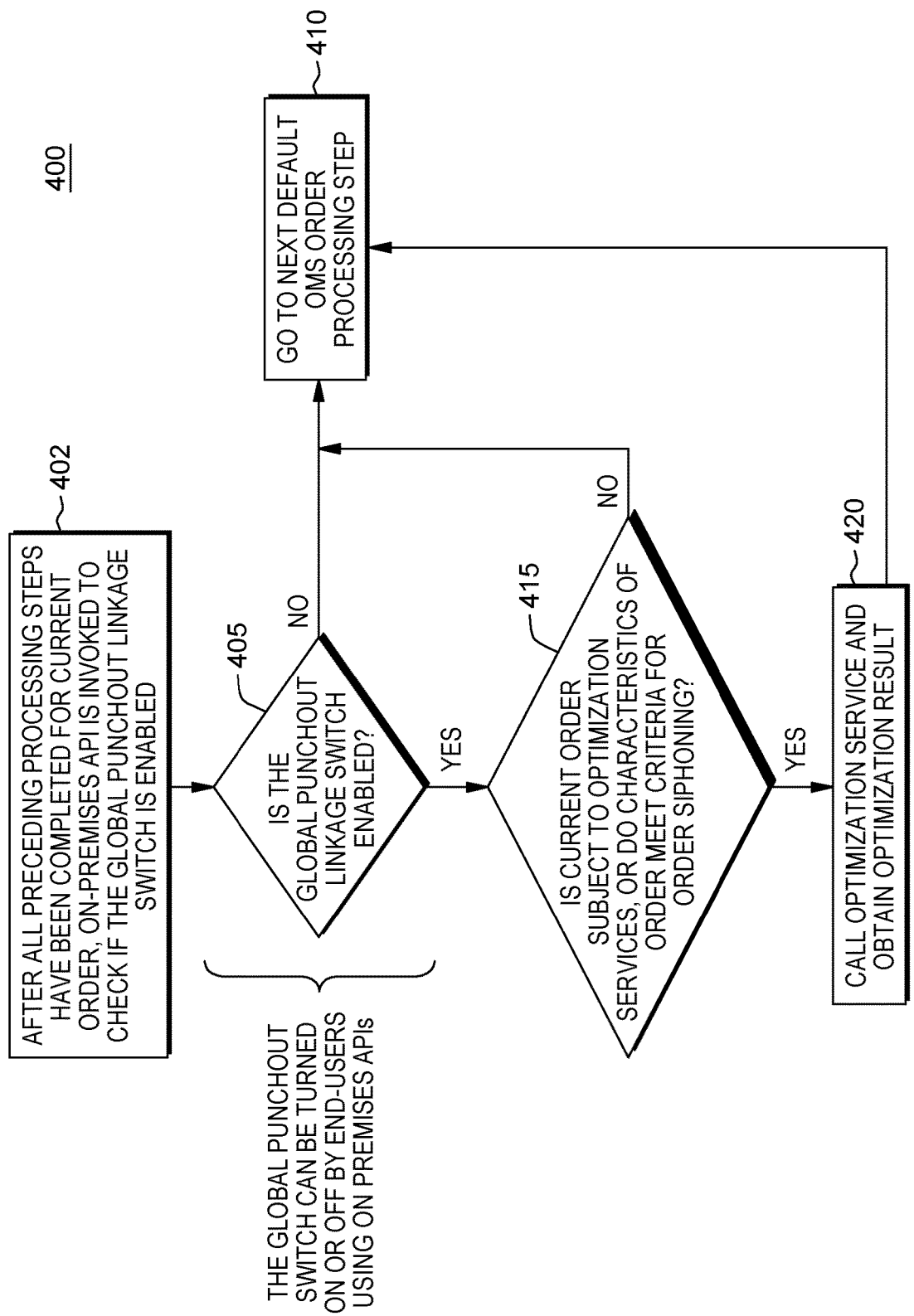
FIG. 4A is a method run at the framework connector plug-in depicting global linkage switch operations for accessing the Big Data analytics and optimization services according to one embodiment.

FIG. 4A is a method 400 run at the framework connector plug-in module 250 and directed to operations of a global link switch that directs processing flow for accessing the Big Data analytics and optimization services. In one embodiment, at 402, after preceding steps of a transaction pipeline flow for a given order have been completed, then either as part of the punch-out function, or framework connector plug-in, or both, an on-premises API call is initiated to determine whether a global punch-out linkage switch 275 has been activated. In one embodiment, the system receives a punch-out user exit API call 225 from the OMS system pipeline flow processing at a configured time, or based on a specific order characteristic(s). If the punch-out API call 225 is received, a determination is made at 405 as to whether a global linkage switch 275 to the optimization services has been turned on/off at the framework connector. This global switch 275 can be turned on/off by end users using on-premises APIs. As an example, a user may be able to turn off the global linkage switch when there are known hybrid cloud connectivity issues or when unusually high order volume and excessive backlogs dictate reconfiguration. Thus, in one aspect, whenever deemed appropriate or necessary, an order management operations team can turn off the punch-out capability, thereby bypassing all orders from the optimization service and hence passing the original orders through the remainder of the transaction processing pipeline (thereby applying traditional order processing). It is understood that for additional safeguard and flexibility, the global link switch 275 is implemented as part of the framework connector plug-in 250, or as an add-on to the punch-out exit function 225.

If, at 405, it is determined that the global linkage switch is disabled, then the remaining default OMS order processing continues at 410 with no call to optimization services. Otherwise, at 405, if the global linkage switch is enabled, then the process continues at 415 where, in one embodiment, it is determined whether the current order is subject to optimization services, or that characteristics of the current order meet criteria for order siphoning. That is, based on specified "order characteristics", such as may be set up at the framework connector switch by the administration team, the linkage switch may be configured to permit a subset of orders to flow through the connector 250 to the Optimization Framework, while orders not matching the order characteristics specification will bypass the Optimizer Framework and pass the original order through the remainder of the transaction processing pipeline (thereby applying traditional order processing). For example, one characteristic of the orders such as, e.g., the state of the orders' origination or the zip code of the orders' origination, or any other circumstance, may dictate punch-out calls for optimization services. Other example types of order characteristics include, but are not limited to: an order containing multiple order lines where some order lines are going to one ship-to address and others are going to another; or another order example where an order line contains a special item; or another order example where the order is destined for a special set of zip codes which require special instructions.

Thus, at 415, if it is determined that the current order transaction is to be optimized, or that its characteristics are such that the order being processed meet criteria for siphoning, the framework connector will initiate an exit from the OMS transaction processing pipeline and proceed to step 420 to call optimization services processing to obtain an optimization result in the optimization framework. Afterwards, the process will proceed to step 410 to commence the next default OMS order processing step. Otherwise, analytics and optimization services processing at optimization framework will be completely bypassed and the OMS transaction processing pipeline flow will continue at step 410.

It should be understood that, at step 415, FIG. 4, the inverse scenario is supported in which a determination can be made as to whether the characteristics of the current order transaction being processed meet criteria for completely bypassing the Optimization Framework and pass through the remainder of the transaction processing pipeline (thereby applying traditional order processing). In this context, all other orders, not matching the specification will flow to the optimizer framework services.

In either scenario, the order criteria and order characteristics for determining order siphoning for optimization processing at step 415 is end-user configurable.

Further, in one embodiment, the setting of the global linkage switch 275 to the optimization framework services is turned on/off by the user or administrator via the vendor premises 200. In such an embodiment, the framework connector 250 may be configured as a processing "plug-in" to the OMS processing engine 120 running at the customer premises computing device. The connector 250 may be further configured to provide an administration interface in which the global linkage switch may be set. For example, as contracted, e.g., for a subscription fee, a customer, such as a vendor, may pre-program connector logic to provide punch-out for optimization services provided via the SaaS hybrid cloud 300.

In a further embodiment, further to the processing of FIG. 4A, if is determined at 405 that the global punch-out linkage switch is not disabled and the current order is subject to optimization services, and if it is determined at 415 the characteristics of the current order meet the criteria for order siphoning, then the optimization processing at 420 may include first determining a current state of the given transaction. In one embodiment, the connector logic determines at what point in the OMS processing the punch-out has occurred and/or whether the characteristics of the order currently in the OMS processing flow for that transaction dictate application of a specified optimization service. Alternately or in addition, a user may contract with the OMS fulfillment or vendor via a service level agreement (SLA) to provide such optimization services for the received particular order or order type. With this information configured into the framework connector 250, a kind of optimization(s) to be performed may be determined for that punch-out customer transaction. Thus, step 420 may optionally include programming a kind of optimization(s) to be performed for that punch-out customer transaction in advance such that the system may conduct an OMS processing flow punch-through for the customer and perform an optimization at a pre-determined time, e.g., based on a customer objective.

In one embodiment, once the framework connector logic determines the type of optimization for that transaction, e.g., based on matching characteristics criteria, proper transaction state data and other data stored in connection with the transaction pipeline state for that transaction can be obtained. Then, for that order to be optimized, the optimizer framework connector makes a call or alternately a query to optimization services via the SaaS environment 300.

Further to the process flow of FIG. 4, after punch-out, the framework connector application runs operations to gather the data used for optimization model which may include all of the processing orders, all the lines, all the quantities, all the SKU numbers, etc. The optimizer computes, based on the data, an optimization as requested or necessitated by the particular type of order. For example, optimization services may be queried to determine a lowest cost order fulfillment. The optimizer may optimize any consideration according to the user objectives, e.g., determine another node for fulfillment to avoid a risk of mark-down at a particular node, e.g., optimize shipping cost and minimize a mark-down issue. If optimization is disabled, the logic processing step will proceed normally.

The SaaS hosted run-time optimization framework 300 runs further computer-implemented methods to provide a mechanism in which any unexpected optimization failure or unanticipated latency with dynamically adjusted thresholds per order, allows traditional transactions to successful complete based on the implemented on-premise rules based/heuristic transaction logic. That is, the call for optimization services and optimization processing is configured to minimize a response time. As the complexity of the optimization process is a function of the order's number of lines, line quantity, package weight, etc., the optimization response time (per SLA) for a given order could be configured based on these factors. A CPLEX timeout could then be set. If the optimization time exceeds the timeout value, the framework may then return a sub-optimal result. For example, after a punch-out call to the hybrid cloud service in the cloud, the optimization processing pursuant to the call and provision of an optimization result is to occur within a predetermined amount of time, e.g., less than 500 ms, or as contracted for via a particular SLA. This optimality utilizes hybrid cloud cache and data services 320 that are optimized to comply according to the SLA conditions or terms to provide and return an optimization result within a minimum response time.

That is, even when establishing a high performance, scalable, and fault-tolerant SaaS Service Framework, performance issues and failures external to the framework can impact service delivery (e.g., data center failures, router failures, WAN network congestion and reliability issues, etc.). In one embodiment, the computer implemented methods implemented via on-premise framework connector on-premise client 200 and SaaS parallel compute framework 300 address these uncontrollable external issues by providing a "fail-safe" architecture for on-premise and cloud integration.

Thus, returning to FIG. 4, as part of step 420, after obtaining and marshalling the relevant data to the optimizer cloud service 300, and after the optimization service call is complete to optimize the order via a back end optimization server, it may be determined whether the data processing system of the hybrid cloud service has experienced a processing latency issue that is not in compliance with the SLA as determined at the connector 250. For example, if the latency or failure condition or violation exists or is anticipated, then the process returns to invoke the default order processing by the existing OMS with no optimization using the order data as is typically used in OMS processing. Otherwise, if no latency or failure condition or violation exists, then the process returns the optimization result at 420, and the returned optimization result data is then provided as output to the next processing logic step of the order processing flow process.

For example, with respect to response latency, if the Framework Connector 250 determines that optimization service requests are taking too long to complete (increased latency), the SaaS Framework Connector 250 will return an appropriate signal including a return code to the user exit, so that the user exit can pass the original order through the remainder of the transaction processing pipeline (thereby applying traditional order processing). Request latency timeouts are set dynamic per request, based on order characteristics that could affect optimization solving performance (such as lines/SKUs per order). Predictive analytics will be applied to auto-adjust timeouts based on order clustering (characteristics) and historical learning.

Figure 4B:
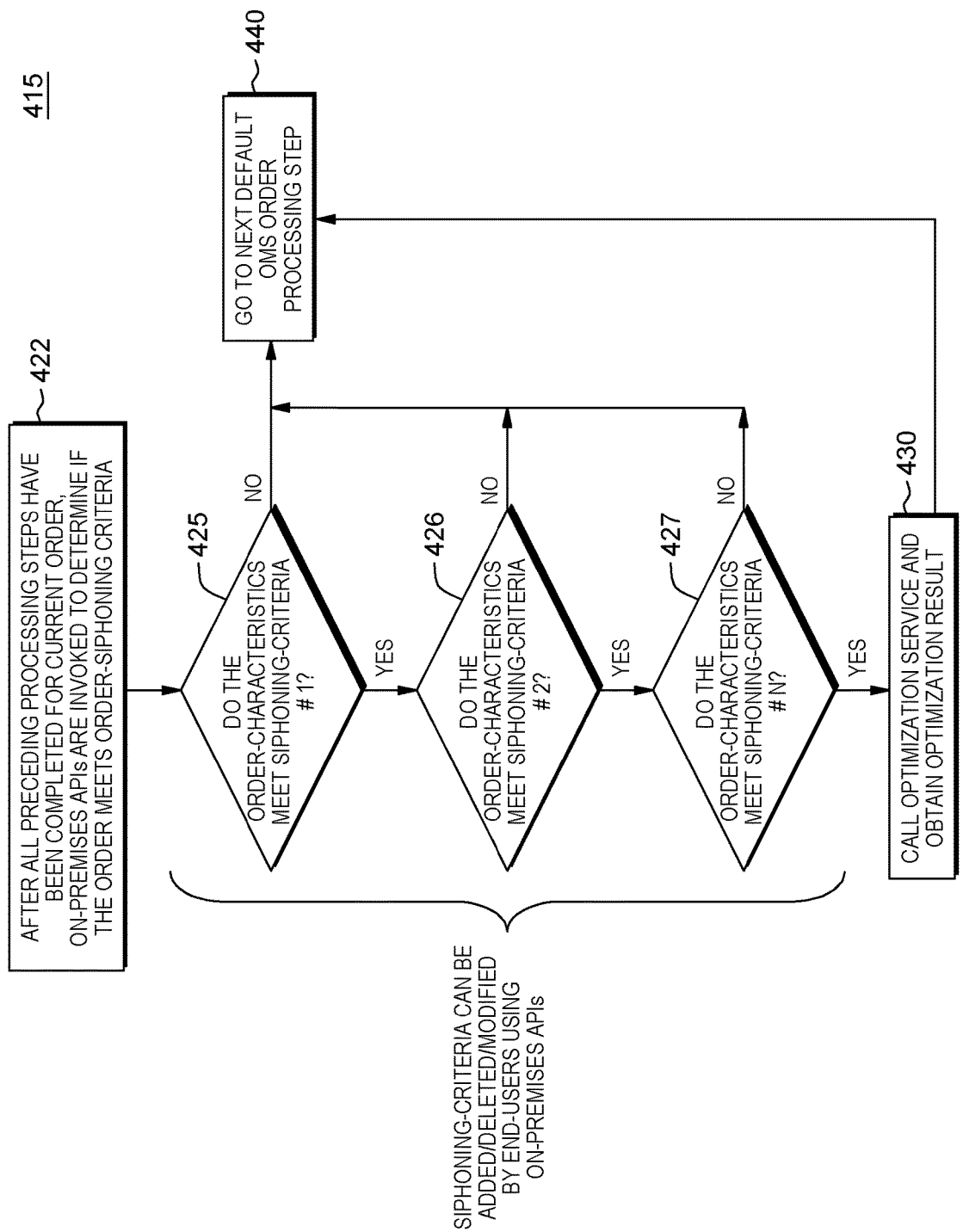
FIG. 4B shows a detailed method flow 415 depicting steps for determining whether characteristics of the current order meet criteria for order siphoning.

FIG. 4B shows a detailed method flow 415 depicting steps for determining whether characteristics of the current order meet criteria for order siphoning. Step 422 tracks step 402 of FIG. 4A, where it is ensured that all preceding steps of a transaction pipeline flow for a given order have been completed. Then, either as part of the punch-out function, or framework connector plug-in, or both, an on-premises API call is initiated at 425 to determine whether the order characteristics meet a first siphoning criteria. As mentioned, siphoning-criteria may be added/deleted or modified by end-users using on-premises APIs. If the order criteria do not meet a first siphoning criteria, then the process proceeds to step 450 where the method proceeds to the next default OMS order processing step. Otherwise, at 425, if the first order criteria do meet a first siphoning criteria, then the process proceeds next to step 426 to determine whether the order characteristics meet a second siphoning criteria. If the order criteria do not meet the second siphoning criteria, then the process proceeds to step 450 where the method proceeds to the next default OMS order processing step. Otherwise, at 426, if the second order criteria do meet a first siphoning criteria, then the process proceeds next to a subsequent step 427 to determine whether the order characteristics meet an $n^{th}$ siphoning criteria. If all the order characteristics of the current order meet each of the siphoning criteria, then the process proceeds to step 430, corresponding to step 420 where optimization services call is made to obtain an optimization result. Otherwise, if no order characteristics meet a siphoning criteria, or after calling an optimization service and obtaining an optimization result at 430, the process proceeds to 440 that corresponds to step 420 in order to obtain the next default OMS order processing step.

Figure 3C:
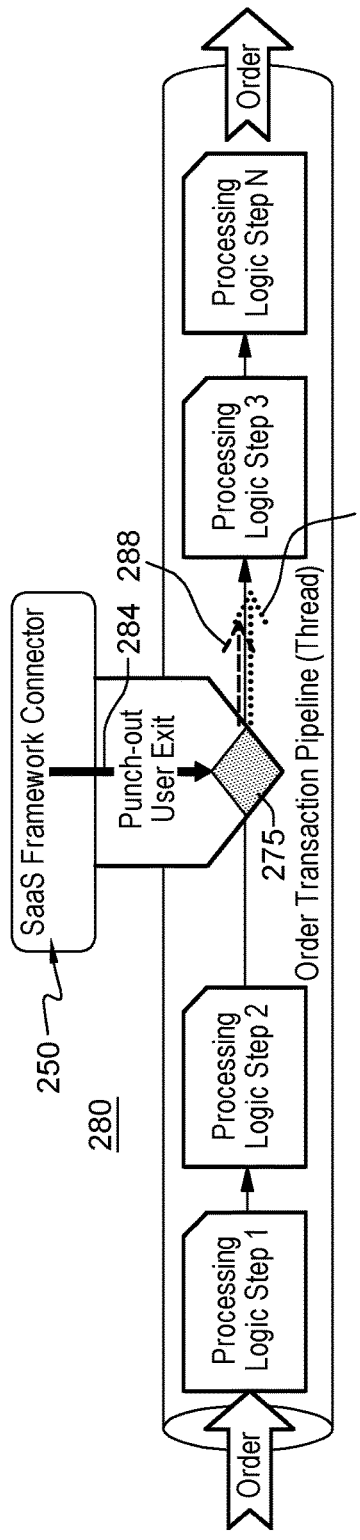
FIG. 3C depicts an example order transaction pipeline scenario in which the framework connector has initiated an optimization service and is further configured to detect a failure condition or inordinate optimization processing latency condition.
Figure 3B:
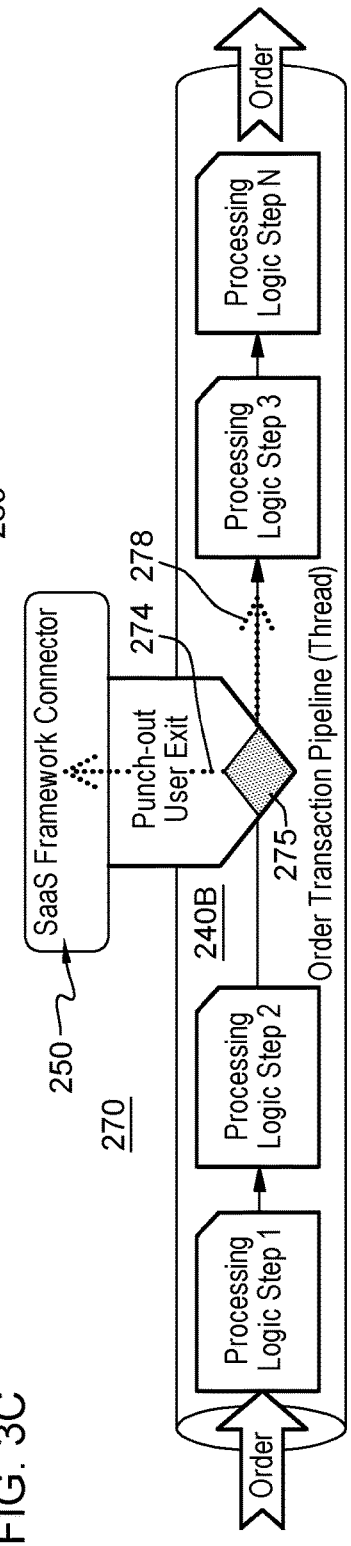
FIG. 3B depicts an example order transaction pipeline scenario in which a global enable/disable (linkage) switch is configured for filtering a subset of orders for optimization services based on an order siphoning criteria.
Figure 3A:
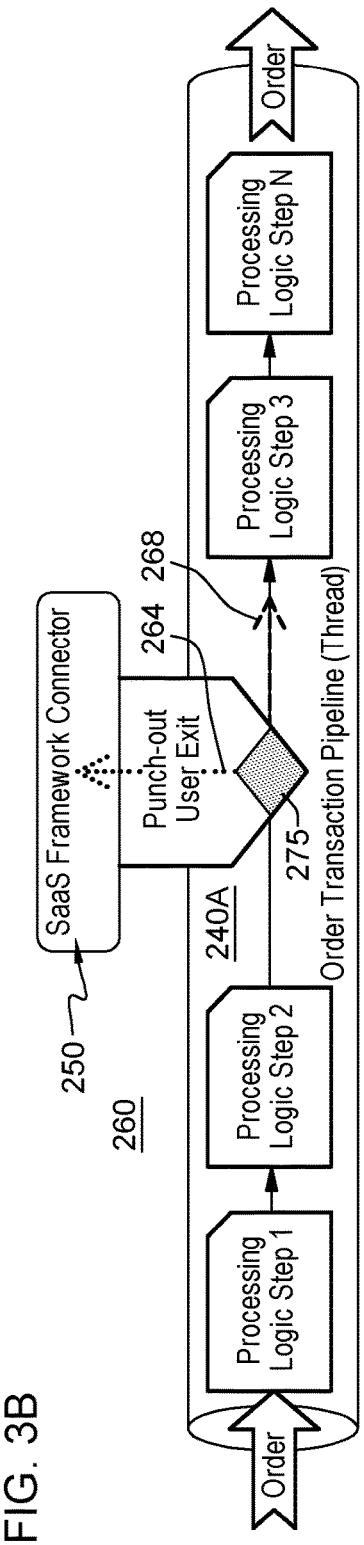
FIG. 3A depicts an example order transaction pipeline scenario in which an on-premise client is configured as a global enable/disable (linkage) switch to configure the transaction order processing flow in one embodiment.

FIG. 3A depicts an example order transaction pipeline scenario 260, in which a global enable/disable (linkage) switch 275 is provided to configure the transaction order processing flow. In one embodiment, either as part of the user punch-out function, or framework connector plug-in, or both, with the global punch-out linkage switch 275 activated, framework connector 250 will call the optimization service and the order processing will flow to the optimizer and call optimizer services via the framework connector at 264; otherwise, if switch 275 is set as "off," the optimizer service will be completely bypassed and orders will follow the traditional pipeline logic flow 240A to the next OMS processing step at 268.

Thus, in the example shown in FIG. 3A, OMS transaction pipeline 240A may process a customer order having multiple on-line purchase items with different SKU numbers. With punch-out linkage switch 275 deactivated, conventional OMS rule-based logic may be implemented at processing logic step 3, e.g., continue OMS processing to obtain EFC/store and get the node at the closest shipping zip code to minimize shipping cost. However, with the punch-out linkage switch 275 activated, framework connector may be configured so that certain optimization considerations be made and an optimization model may be accessed that could be configured to minimize shipping cost or avoid markdown at a node, and/or balance fulfillment across the network to reduce inventory risk, or minimize/balance labor cost. In one embodiment, an optimization model may look at multiple objectives which a user has rated as a paramount business objective to consider. This objective importance rating for the optimization model may be specified ahead such as by using a slider mechanism via a graphic user interface to specify specifying one or multiple objectives. For example, a user may rate which consideration is paramount in accessing the optimization logic. In one embodiment, the user may access a configuration user interface and via slider mechanisms specify the important objectives, such as by weighting the objectives for the optimization model to be performed, e.g., mark-down avoidance, or minimizing shipping cost which business users can specify.

Figure 3D:
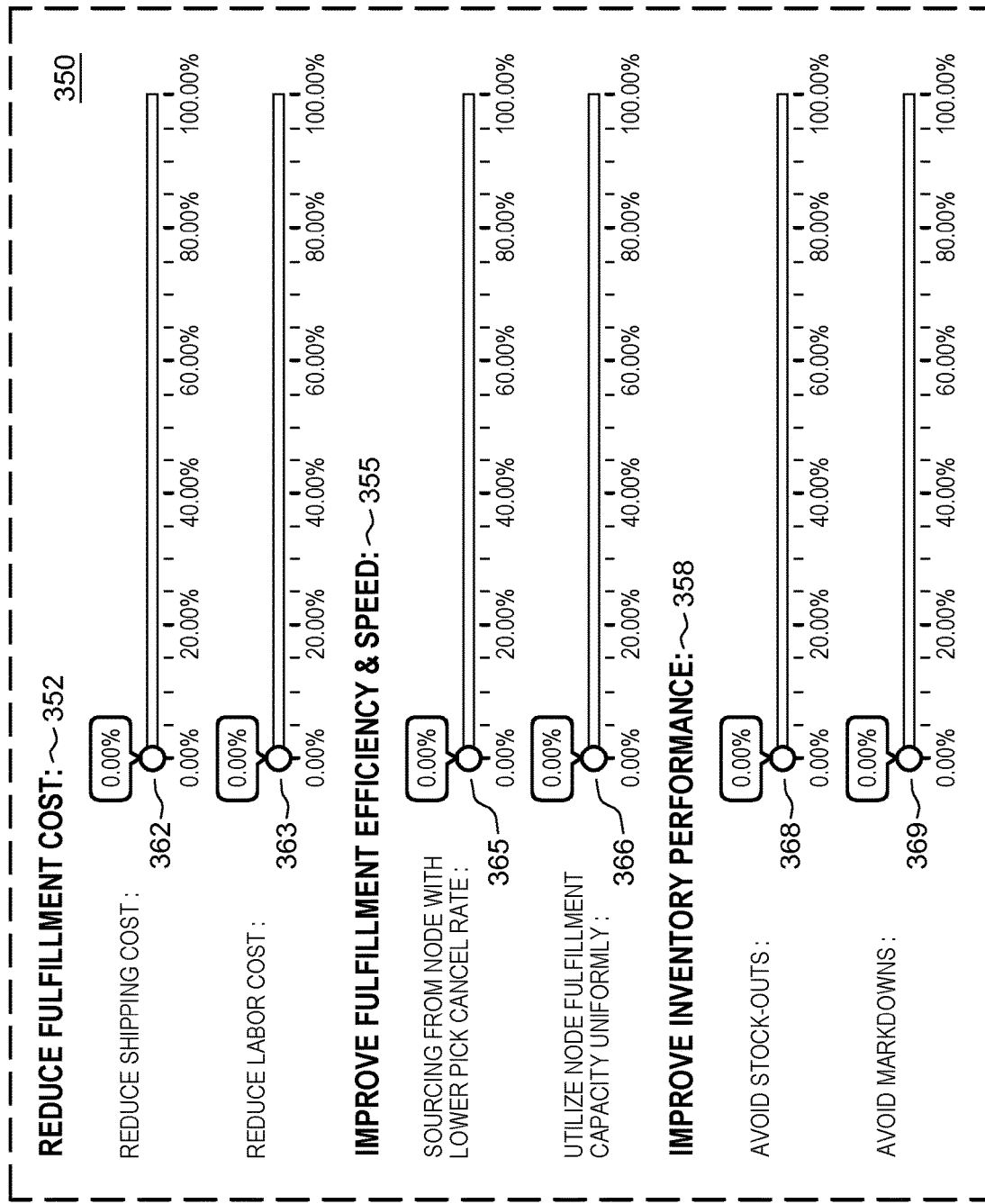
FIG. 3D provides an example graphic interface presented to a user's computer device, to enable a user to select one or more particular objectives for an optimization model to be performed according to one embodiment.

FIG. 3D provides an example graphic interface 350 presented to a user's computer device, to enable a user to select one or more particular objectives for an optimization model to be performed. These objectives for input to the system are set by users, via a display interface, with different objective settings at different times. In one non-limiting embodiment, selection of particular objectives is made via slider mechanism, with selections as percentages ranging anywhere from between 0% and 100%, for example, Any type of selection tool objective selection for input to the system via a graphic interface may be used. Example objectives generally include, but are not limited to: reducing fulfillment costs 352, with available user-selectable objectives being reducing shipping costs or reducing labor costs as selectable via respective slider bar interface 362, 363; improving fulfillment efficiency and speed 355, with available user-selectable objectives including a percentage of sourcing from a node with lower pick cancel rate via slider bar tool 365, and utilizing node fulfillment capacity uniformly via slider bar interface 366; and improve inventory performance 358, with available user-selectable objectives including avoiding stock outs (outages) via slider bar tool 368, and avoiding markdowns via interface slider bar interface 366.

As an example use, a user such as a retailer may select that, during an off-peak time, the retailer's objective may to minimize the shipping cost. During the peak time, the retailer's objective may be to minimize the shipping cost as well as utilize the node fulfillment capacity across the network uniformly. Closer to the end of the season, the retailer's objective may be to reduce the number of potential markdowns or to avoid stock-out situations for walk-in customers in the stores.

FIG. 3B depicts an example order transaction pipeline scenario 270, in which a global enable/disable (linkage) switch 275 is configured for order siphoning. In one embodiment, with the switch 275 and order siphoning criteria specified for filtering a subset of orders for optimization services, the framework connector 250 will first run processes to determine whether the current order has characteristics that match the specified order siphoning criteria. If the current order has characteristics criteria that match the specified order siphoning criteria then the order processing will flow to the optimizer and call optimizer services via the framework connector at 274; otherwise, if the current order has characteristics do not match the specified order siphoning criteria, then the optimizer services will be completely bypassed and orders will follow the traditional pipeline logic flow 240B to the next OMS processing step at 278.

FIG. 3C depicts an example order transaction pipeline scenario 280, in which, with the linkage switch 275 activated, framework connector 250 has called the optimization service and the order processing flow is at the optimizer where optimizer services are invoked at the hybrid cloud server 305. The running of optimization model, via an optimizer service, is monitored by the Framework Connector 250, particularly to ensure optimization results are provided within a latency constraint such as may be specified at the connector in conformance with an SLA. Such a latency constraint may be variable and depends upon the order characteristics. In an instance of a service failure, i.e., if the SaaS Framework Connector detects a service request failure and/or returns a signal 284 having an appropriate return code to the user punch-out switch 275, the user exit will pass the original order through the remainder of the transaction processing pipeline (thereby applying traditional order processing) such as shown by arrow 288. Otherwise, if the optimizer server processes do not result in a processing delay or inordinate latency, then any optimization results returned are provided back as part of the order transaction processing pipeline as indicated at 289 for further processing at the next OMS processing step.

In one embodiment, the framework connector 250 can also detect repetitive failures, and if appropriate, based on failure type automatically disable optimization globally or enable some default order profile siphoning to lessen SaaS Framework load.

By combining redundancy in the cloud base infrastructure 300 and resiliency in the cloud hosted services framework 300 with the on-premise "punch out" model preserves traditional order management process follows on-demand, on defined conditions, and when needed to latency or failure, computer-implemented methods ensure that the most rigid SLAs can be achieved when integrating on-premise and cloud hosted services to introduce in-line transaction based analytics.

Figure 6:
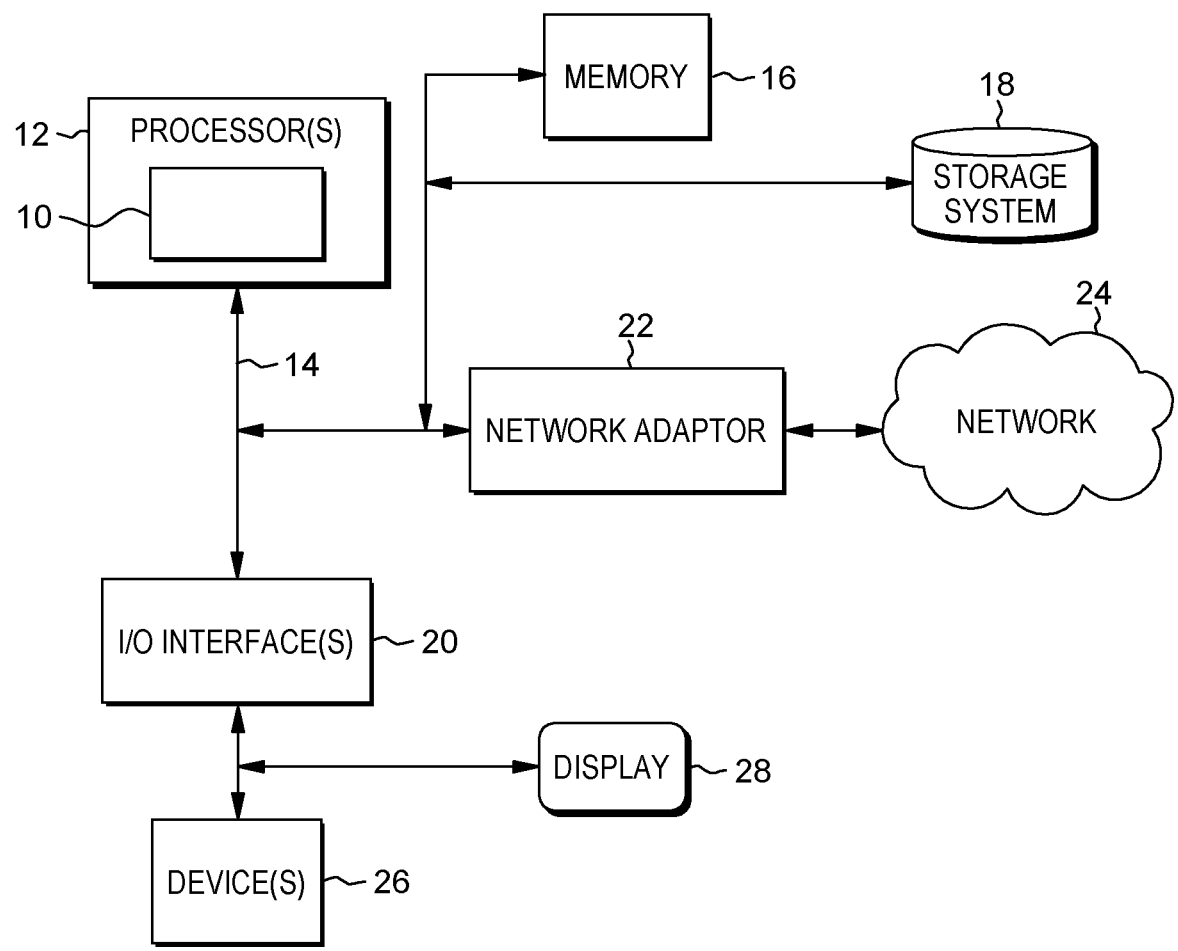
FIG. 6 depicts an exemplary hardware configuration for performing methods such as described in one embodiment.

FIG. 6 illustrates a schematic of an example computer or processing system that may implement the cloud hosted services framework 300 with the on-premise "punch out" model in a manner that preserves traditional order management processes in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, and external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. An order processing system comprising:
one or more hardware processor devices configured to receive data relating to multiple customer orders for items and control a flow of order processing operations for each order implemented via an order management rules-based processing system;

an optimizing system comprising a plurality of parallel-operating computing devices each configured to run an optimization model for optimizing an order processing operation;

the one or more processor devices further running an on-premise client application configured to exit the order processing flow at any time during a respective order processing for that order in response to a punch-out call received from said one or more processor devices to exit the flow at one of: at a predetermined processing step, or in accordance with one or more predetermined customer order characteristics, said one or more predetermined customer order characteristics configured in advance by a user, and communicate an optimization service request over a network to a computing device of said optimizing system to optimize an order processing operation in accordance with one or more user objectives, a plurality of pre-established connections stored in a pool of connection, each pre-established connection of said pool configured to communicate the optimization service request from said on-premise client application to a computing device of said optimizing system, a service connection to said optimizing system established responsive to receipt of said punch-out call;

said optimizing system configured to run an optimization model for each of multiple optimization service requests at a respective said computing device in parallel, wherein said on-premise client application communicates said optimization service request responsive to a punch-out user exit command received from said one or more processor devices during said flow of order processing operations, and said on-premise client application is pre-configured to detect an optimization processing delay in excess of a specified time period, and in response to a detection, said on-premise client application returning a coded signal indicating that a remainder of that customer's order processing operations continues via the order management rules-based processing system.

2. The system of claim 1, wherein said on-premise client application is configured as a global switch to enable an exit from the order processing operations flow for a respective customer order responsive to a received punch-out command, or prevent any exit from the order processing flow.

3. The system of claim 1, wherein one or more said optimization models are pre-established to run at each respective said computing device, said optimizing system running a load balancing device for distributing multiple optimization service requests communicated by said on-premise client application for customer orders among said plurality of said computing devices in a round-robin fashion.

4. The system of claim 1, wherein said on-premise client application is pre-configured to, upon said exit, obtain and format data representing a state of the order processing at a time of the exit for use by the optimization model, and communicating said state data to a computing device running the optimization model.

5. The system of claim 1, wherein said on-premise client application is pre-configured to, upon said exit, automatically configure communication with a computing device running the optimization model by providing security or authenticating codes for accessing the computing device.

6. The system of claim 1, wherein said on-premise client application is pre-configured to detect a service request failure, said on-premise client application returning a coded signal indicating that a remainder of that customer's order processing operations continues via the order management rules-based processing system.

7. The system of claim 1, wherein said running said optimization model at a computing device comprises performing one or more computations using said order processing state data to obtain an optimization result, said on-premise client application returning a coded signal indicating that a remainder of that customer's order processing operations continues using said optimization result.

8. A computer program product for processing customer orders for items, the computer program product comprising a non-transitory computer usable medium having computer readable instructions embodied in said medium, said instruction configuring a computer to run a method comprising:

receiving, at one or more processor devices, data relating to multiple customer orders, said one or more processor devices controlling a flow of order processing operations for each order implemented via an order management rules-based processing system;

running, at a plurality of parallel-operating computing devices, an optimization model for optimizing an order processing operation;

running, via the one or more processor devices, an on-premise client application configured to exit the order processing flow at any time during a respective order processing for that order in response to a punch-out call received from said one or more processor devices to exit the flow at one of: at a predetermined processing step, or in accordance with one or more predetermined customer order characteristics, said one or more predetermined customer order characteristics configured in advance by a user, storing a plurality of pre-established connections in a pool of connections, each pre-established connection of said pool configured to communicate the optimization service request from said on-premise client application to a computing device of said optimizing system, and communicating, via one of said pre-established connections, an optimization service request over a network to a computing device of said optimizing system to optimize an order processing operation in accordance with one or more user objectives, wherein, said one or more computing devices are configured to run an optimization model for each of multiple optimization service requests in parallel, said instructions further configuring the computer to run a method comprising:

receiving, at said on-premise client application, a punch-out user exit command received from said one or more processor devices during said flow of order processing operations, said on-premise client application communicating said optimization service request in response to said received exit command, said on-premise client application being pre-configured to detect an optimization service processing delay in excess of a specified time period and in response to a detection;

returning a coded signal indicating that a remainder of that customer's order processing operations continues via the order management rules-based processing system.

9. The computer program product of claim 8, wherein said on-premise client application is pre-configured to detect an optimization service request failure, said instructions further configure the computer to run a method comprising:

receiving, at the on-premise client application, a coded signal indicating an optimization service request failure, and in response, continuously processing a remainder of that customer's order processing operations via the order management rules-based processing system.

10. The computer program product of claim 9, wherein if no optimization service request failure is detected, said on-premise client application returning an optimization result, and in response, a remainder of that customer's order processing operations continues using said optimization result.

\* \* \* \* \*